June 6, 1961 W. P. STERN 2,987,343
DETACHABLE AND WASHABLE ARMREST
Filed Dec. 2, 1958
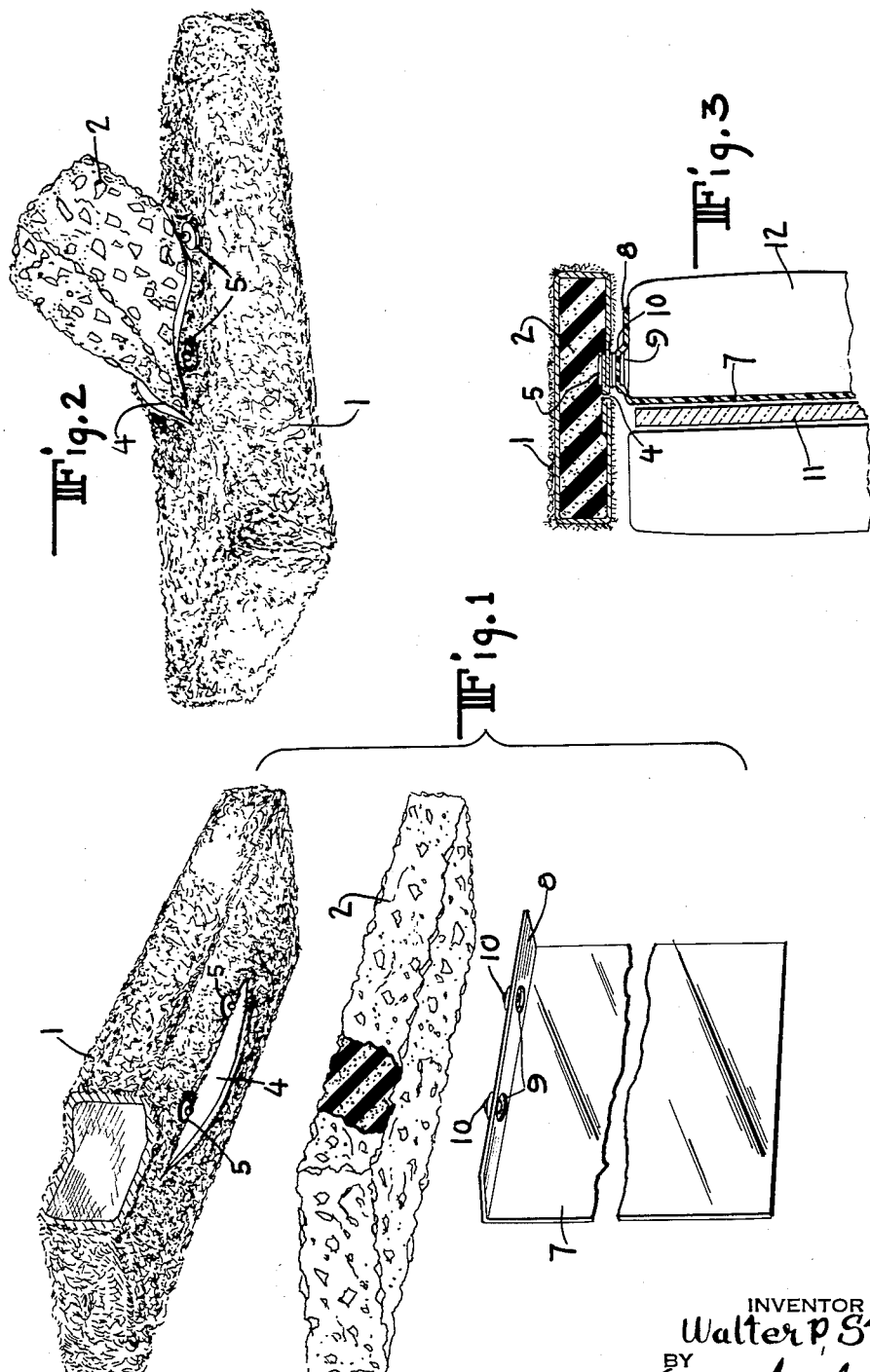
INVENTOR
Walter P. Stern
BY
Hammond and Littell
ATTORNEYS

United States Patent Office 2,987,343
Patented June 6, 1961

2,987,343
DETACHABLE AND WASHABLE ARMREST
Walter P. Stern, New Albany, Ind., assignor to
William E. Kelsey, Arcadia, Ind.
Filed Dec. 2, 1958, Ser. No. 777,650
2 Claims. (Cl. 296—49.2)

This invention relates to armrests for use in vehicles having window openings next to the operator or the passengers. These armrests are of a readily detachable and washable type.

Many operators of automobiles, trucks and other vehicles extend their left arm outside the vehicle window adjacent to the operator and rest their arm on the window opening, especially while driving in warm weather. This practice has the disadvantage that the arm is resting on a hard, uneven surface and in warm weather perspiration from the arm tends to injuriously affect the finish. Several attempts have been made by others to supply arm rests for use in the above-outlined situations. All of these prior armrests have had various drawbacks. If they are permanently mounted, the window cannot be raised or if raised, the armrest raises also, causing a partial blocking of vision. If they are spring clip mounted, they scratch the painted surface of the metal window frames. They all quickly discolor and become odoriferous with use.

The object of this invention is to provide an armrest which can be detachably mounted on the window frame of a vehicle without scratching the surface of the painted metal or the window glass, which has an absorbent washable cover, and which can easily be taken apart for cleaning.

Another object of this invention is to provide an armrest which can be readily disassembled for storage and shipping.

A further object of this invention is to provide an armrest having an easily detachable, washable and absorbent cover.

Other objects and features of my invention will be more apparent as the description proceeds.

My invention provides a satisfactory armrest having all the advantageous features outlined above and none of the objectionable features of prior armrests. This armrest consists of a small piece of resilient sponge material such as sponge rubber or plastic foam having a cubical shape with a length of from 3 inches to that of the window opening, a breadth of approximately the width of the window-opening ledge and a thickness of at least one-fourth of an inch. This piece of resilient material is covered with an absorbent cloth such as terry cloth or toweling. On the bottom surface of the absorbent cloth cover is a small slit into which the piece of resilient sponge material can be inserted or by which it can be removed. Adjacent to the slit are fastening devices to which a plastic tab is fastened. When the armrest is assembled the plastic tab is inserted between the window glass and the window frame of the door or window of the vehicle and positioned as convenient to the user. The armrest is held in position by the pressure of the window glass and the window frame against the plastic tab insert.

In the drawings which illustrate a preferred form of embodiment:

FIGURE 1 is an exploded, perspective view of the armrest.

FIGURE 2 is a perspective view of the pad and cover assembly of the armrest.

FIGURE 3 is a cross-sectional view of the armrest in position in a window frame.

Referring to the drawings the armrest of my invention is shown in exploded perspective in FIGURE 1. This armrest consists of an absorbent cover 1 of toweling, terry cloth or the like, a piece of resilient sponge material 2, the size of the absorbent cover, and a plastic tab or insert 3. The absorbent cover 1 has a slit 4 and snap-fasteners 5 on the bottom. The piece of resilient sponge material 2 is inserted into the slit 4 of the absorbent cover 1 and fills the space 6 within the absorbent cover 1 similar to the way a pillow fits a pillow case. The plastic tab 3 can be of any plastic material sufficiently plasticized to be non-brittle at normal temperatures and sufficiently stiff to hold its shape and position. The plastic tab 3 is shaped from one piece of plastic sheet having a width of less than the length of the absorbent cover 1 and is bent in the form of an angle of 90° or slightly less with a long arm 7 for insertion between the window glass and window frame and a short arm 8 of about 1 inch in length. This short arm 8 has two upward protrusions 9 formed therein and the opposite members 10 of snap-fasteners 5 are fastened to these protrusions 9. By the expedient of fastening the metallic snap-fastener parts to the upward protrusions 9, when the plastic tab 3 is inserted between the window and the door frame the metallic snap-fastener parts are offset from the window frame and therefore cannot scratch the painted finish. In FIGURE 2 the insertion of the piece of resilient sponge material 2 into the slit 4 of the absorbent cover 1 is shown. In FIGURE 3 a cross-section of the armrest in use is shown. The long arm 7 of the plastic tab 3 is inserted between the window glass 11 and the window frame 12. This can be on either side of the window glass 11 and the short arm 8 can be positioned either toward the outside or inside of the vehicle. The protrusions 9 protect the upper surface of the window frame 12 from contact with metallic snap-fastener parts 10. Snap-fasteners 5 are affixed and held rigidly in place in the absorbent cover 1 containing the piece of resilient sponge material 2.

The armrest can be conveniently positioned by the operator of the vehicle with one hand while the vehicle is moving and can likewise be quickly detached with one hand while the vehicle is moving. This feature of quick removal is of advantage in allowing prompt closing of the window during sudden storms.

This armrest can be inserted between the window glass and window frame at any point convenient to the user. The armrest is kept from sliding by the pressure of the window glass against the window frame. It self-evident that the armrest can be employed in any vehicle having a conventional window and window wells such as passenger cars, trucks, railroad engines, boats etc. and can be used on either the left or right window, if the passenger in an automobile wishes also to use an armrest.

The absorbent cloth cover 1 is readily detachable from the tab 3 and the sponge insert 2 and launders with ease, therefore it can be kept free of any unsightly stains or unpleasant odors. The sponge insert 2 absorbs any excess perspiration which passes through the cover 1 and can also be washed to remove perspiration and odors therefrom.

While I have shown a specific embodiment of my invention, it will be readily understood that various modifications and changes may be made in this embodiment without departing from the spirit of my invention as defined by the scope of the appended claims.

I claim:

1. A detachable armrest for mounting in the window frame of a vehicle comprising a rectangular piece of resilient sponge material covered with an absorbent cloth, said cloth having a small open slit for ready removal of said piece of resilient sponge material therefrom and a plastic tab detachably fastened to said absorbent cloth, said plastic tab having the form of an acute to right angle with a long arm for insertion in said window frame and a short arm to which said absorbent cloth is detachably fastened whereby said piece of resilient sponge material and said absorbent cloth can be detached from said plastic tab and separately washed.

2. The structure of claim 1 wherein said absorbent cloth is attached to said plastic tab by means of snap-fasteners.

References Cited in the file of this patent

UNITED STATES PATENTS

| | | |
|---|---|---|
| 1,247,547 | Eune | Nov. 20, 1917 |
| 1,890,102 | Urquhart | Dec. 6, 1932 |
| 2,086,244 | Smith | July 6, 1937 |
| 2,520,584 | Underwood | Aug. 29, 1950 |
| 2,709,620 | Tinsley | May 31, 1955 |
| 2,838,340 | Johnson | June 10, 1958 |